United States Patent

Krause

[15] 3,657,732

[45] Apr. 18, 1972

[54] PHASE SYNCHRONIZING SYSTEM

[72] Inventor: Peter L. Krause, Thousand Oaks, Calif.

[73] Assignee: Burroughs Corporation, Detroit, Mich.

[22] Filed: Mar. 9, 1971

[21] Appl. No.: 122,544

Related U.S. Application Data

[63] Continuation of Ser. No. 780,160, Nov. 29, 1968, abandoned.

[52] U.S. Cl. ..............................328/155, 178/69.5, 307/232, 307/295, 328/63, 328/133, 331/17, 331/18

[51] Int. Cl. ..........................................................H03k 5/18

[58] Field of Search.........................178/69.5, 51; 179/15 BS; 307/232, 233, 269, 295; 328/63, 72, 133, 134, 135, 136, 155; 331/14, 17, 18

[56] References Cited

UNITED STATES PATENTS

| | | | |
|---|---|---|---|
| 3,324,399 | 6/1967 | Hall | 328/134 X |
| 3,337,814 | 8/1967 | Brase et al. | 331/18 |
| 3,448,389 | 6/1969 | Suzuki et al | 307/233 X |
| 3,475,062 | 10/1969 | Crittendon et al | 307/232 |
| 3,526,841 | 9/1970 | Holmboe et al | 307/233 X |

FOREIGN PATENTS OR APPLICATIONS

| | | |
|---|---|---|
| 680,390 | 2/1964 | Canada |
| 759,144 | 5/1967 | Canada |
| 799,016 | 11/1968 | Canada |

*Primary Examiner*—John S. Heyman
*Assistant Examiner*—R. C. Woodbridge
*Attorney*—Christie, Parker & Hale

[57] ABSTRACT

A source of periodic controlled signals is synchronized to periodic reference signal by sensing the time interval between given points of the controlled signal and the reference signal during each cycle and correcting the source simultaneously responsive to the sensed time interval in successive cycles. Specifically, the source is corrected by a control signal that is proportional in amplitude to the difference between the sensed time interval in one cycle and twice the sensed time interval in the next subsequent cycle. The period of the source changes in direct proportion to the amplitude of the control signal.

17 Claims, 6 Drawing Figures

INVENTOR.
PETER L. KRAUSE

BY

Christie, Parker & Hale
ATTORNEYS

PHASE SYNCHRONIZING SYSTEM

This is a continuation of Ser. No. 780,160 filed Nov. 29, 1968, now abandoned.

BACKGROUND OF THE INVENTION

This invention relates to phase synchronization and, more particularly, to circuitry that is capable of establishing synchronization of a source of periodic controlled signals to a periodic reference signal within a few cycles.

There are many applications in the field of electronic engineering that call for the synchronization in phase of a source of periodic controlled signals to a periodic reference signal. In some of these applications, such as for example a magnetic disc file storage unit, phase synchronization of different controlled signals to a reference signal must be repeatedly established in the course of operation. Therefore, it is necessary to achieve phase synchronization quickly in order to avoid operational delays.

Conventional phase synchronizing schemes fall into two categories. In the first category, a voltage controlled oscillator is synchronized to a reference signal by applying the reference signal and the output of the oscillator to a phase comparator to generate a control signal that is applied to the frequency controlling element of the oscillator. Thus, the frequency of the oscillator is varied by the control signal in a direction that tends to reduce the output of the phase comparator, and in so doing establishes phase synchronization. In the second category, the reference signal, usually in the form of pulses, is applied directly to the control terminal of a free-running multivibrator or other type of oscillator that has a natural frequency of operation slightly less than the reference frequency. The reference pulses eventually trigger the free-running multivibrator prematurely so it operates in phase with the reference pulses. Both of the described categories of phase synchronizing schemes require that the source to be synchronized operate under the influence of the reference signal for a substantial number of cycles before phase synchronization is initially established.

SUMMARY OF THE INVENTION

In contrast to the prior art schemes described above, the invention contemplates the generation of a control signal that simultaneously reflects the comparison of a first characteristic of the signal to be synchronized and a reference signal and the comparison of a second characteristic of the signal to be synchronized and the reference signal. Two characteristics furnish sufficient information to represent the instantaneous deviation of the signal to be synchronized from synchronization. Consequently, phase synchronization can be established quickly, i.e., essentially in the time it takes to compare the first and second characteristics and generate the control signal. Preferably, the first and second characteristics are the time intervals between given points of the signal to be synchronized and the reference signal during successive cycles. In such case, the control signal is representative in amplitude of the difference between this time interval in one cycle and twice this time interval in the next subsequent cycle. By using these characteristics to generate the control signal, the source of signals to be synchronized can be simply and accurately synchronized within two cycles.

BRIEF DESCRIPTION OF THE DRAWINGS

The features of a specific embodiment of the best mode contemplated of carrying out the invention are illustrated in the drawings, in which.

DETAILED DESCRIPTION OF A SPECIFIC EMBODIMENT

Figure 1:
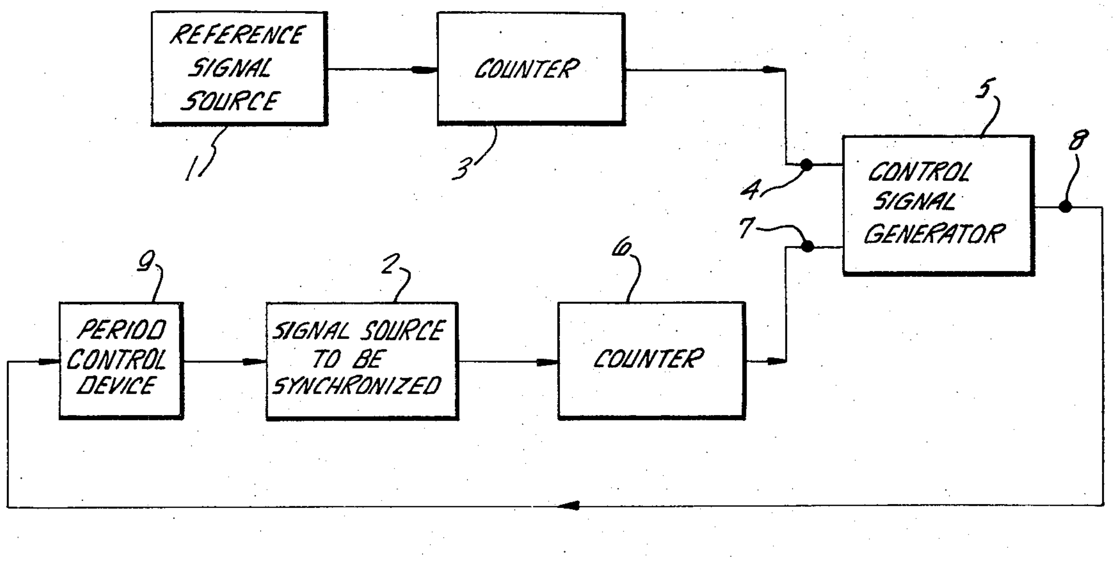
FIG. 1 is a block schematic diagram of a phase synchronizing system.
Figure 3:
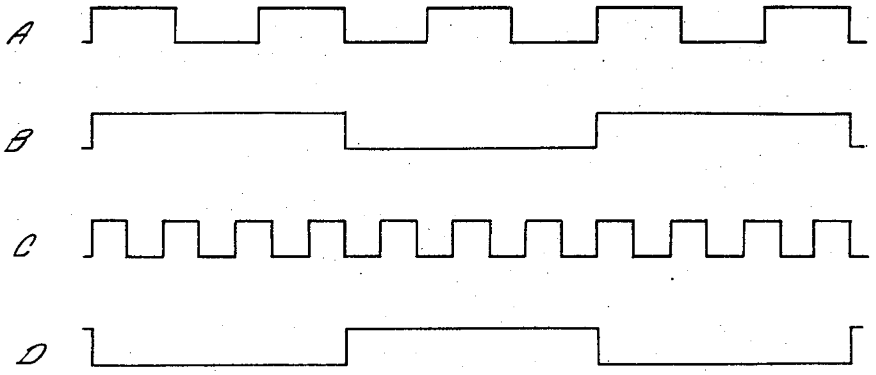
FIGS. 3 through 6 are waveform diagrams of signal amplitude versus time that illustrate the operation of the phase synchronizing system of FIG. 1 and the control signal generator of FIG. 2.

In FIG. 1, a reference signal source 1 and a signal source 2 to be synchronized are shown. Source 1 produces a periodic squarewave reference signal having a very constant frequency. The reference signal is represented in FIG. 3 by waveform A. Source 2 produces a periodic squarewave controlled signal, that is represented in FIG. 3 by waveform C. For the purpose of illustration, it is assumed that the ratio of the frequency of the reference signal to the nominal frequency of the controlled signal is $k_1$:$k_2$. The nominal frequency of the controlled signal is considered to be the frequency at which source 2 is designed to operate absent any external corrective forces. Source 1 is coupled through a counter 3 to an input terminal 4 of a control signal generator 5. Source 2 is coupled through a counter 6 to an input terminal 7 of control signal generator 5. Counter 3 reduces the frequency of the reference signal by a factor of $k_1$ and counter 6 reduces the frequency of the controlled signal by a factor of $k_2$. As a result, the signals applied to input terminals 4 and 7, which are represented by waveforms B and D, respectively, in FIG. 3, are approximately at the same frequency. In the waveforms of FIG. 3, $k_1$ is assumed to be there and $K_2$ is assumed to be seven. At an output terminal 8, generator 5 produces a control signal that is proportional in amplitude to the instantaneous deviation of the periodic signal applied to input terminal 7 from phase synchronization with the periodic signal applied to input terminal 4. This control signal is fed back to a period control device 9 that corrects the frequency of source 2. Preferably, period control device 9 changes the period of the controlled signal produced by source 2 in direct proportion to the amplitude of the control signal applied to its input. Device 9 could comprise any one of a number of conventional arrangements. For example, if source 2 is a free-running multivibrator, device 9 could change the value of the supply voltage toward which the cross coupling capacitors charge or discharge.

In summary, the control signal from generator 5 corrects the period of source 2 to establish phase synchronization between the periodic signals applied to input terminals 4 and 7 of generator 5. The waveforms of FIG. 3 represent the system after synchronization has taken place. As a result of the corrective action, source 2 is synchronized to the reference signal in that every $k_2$ cycles of the controlled signal occur in the same predetermined phase relationship with every $k_1$ cycles of the reference signal. In terms of the example depicted in FIG. 3, the leading edge of every seventh pulse of waveform C occurs at the same time as the leading edge of every third pulse of the reference signal. If $k_1$ is a whole multiple of $k_2$, counter 6 could be eliminated; if $k_2$ is a whole multiple of $k_1$, counter 3 could be eliminated; and if the ratio $k_1$:$k_2$ is unity, counters 3 and 6 could both be eliminated.

Figure 4:
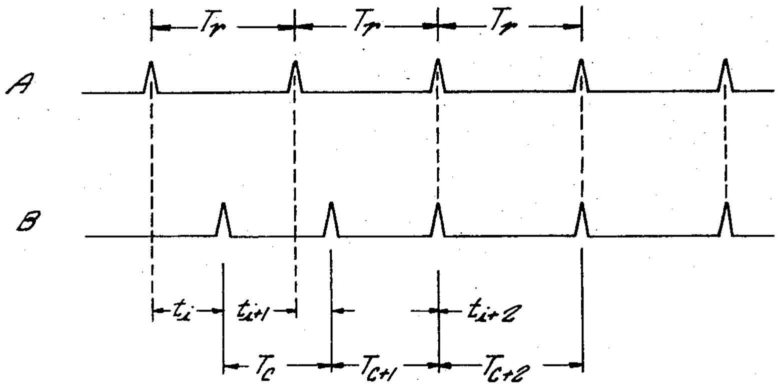

Reference is made to FIG. 4 in connection with the derivation of an equation to define the control signal produced by generator 5. In FIG. 4, waveform A represents a series of reference pulses that have a constant period $T_r$, and waveform B represents a series of pulses to be synchronized that have a controlled period $T_c$. The pulses are represented as short spikes instead of squarewaves to facilitate visualization of the relationships involved. The time interval between the first pulse of waveform A to occur and the first pulse of waveform B is $t_i$; the time interval between the second pulse of waveform A to occur and the second pulse of waveform B is $t_{i+1}$; and the time interval between the third pulse of waveform A to occur and the third pulse of waveform B, designated $t_{i+2}$, is zero. In other words, it is a given condition in FIG. 4 that the pulses of waveform B become synchronized with the pulses of waveform A after two cycles of waveform A, i.e., after a time interval of $2T_r$. For the given condition depicted in FIG. 4, the following equations are valid:

$$t_i + T_c - t_{i+1} = T_r \qquad 1.$$

and $$t_{i+1} + T_{c+1} = T_r \qquad 2.$$

Equations (1) and (2) can be solved simultaneously to yield the following equation:

$$T_{c+1}=T_c+\Delta T_c \quad 3.$$

where $$\Delta T_c=t_i-2t_{i+1} \quad 4.$$

It can be shown that equations (3) and (4) are valid for every cycle in turn of waveforms A and B. In equation (3), $\Delta T_c$ is the correction that must be made to the period, $T_c$, of waveform B in order to satisfy the given condition, i.e., phase synchronization of waveform B with waveform A after two cycles. Equation (4) indicates the correction $\Delta T_c$ can be determined by measuring the time interval between the pulse of waveform A and the corresponding lagging pulse of waveform B during the cycle in question and the immediately preceding cycle. It should be noted that the measurement of the time interval between a pulse of waveform A and the corresponding lagging pulse of waveform B during a single cycle does not alone provide sufficient information to determine the correction to the period of waveform B that is required to achieve phase synchronization. Two comparative characteristics of waveforms A and B are required to derive the corrective term. As expressed in equations (3) and (4), these two characteristics are the time intervals between corresponding pulses of waveforms A and B during two successive cycles. Under appropriate circumstances, it might also be practical to derive the information required to determine the corrective term from two other characteristics, for example, the time interval between corresponding pulses of waveform A and waveform B during every other two cycles, or the time interval between corresponding pulses of waveforms A and B during one cycle and the period of waveform A. To implement equation (4), a first characteristic signal is produced that continuously represents the time interval between each pulse of waveform A and the corresponding lagging pulse of waveform B and a second characteristic signal is simultaneously produced that continuously represents the time interval between each pulse of waveform A and the corresponding lagging pulse of waveform B during the cycle directly following the cycle represented by the first characteristic signal. A control signal is then produced that represents the difference between the first characteristic signal and twice the second characteristic signal. This control signal is a cycle-by-cycle representation of the correction to waveform B required to establish synchronization of the next subsequent pulse of waveform B with waveform A.

Figure 5:
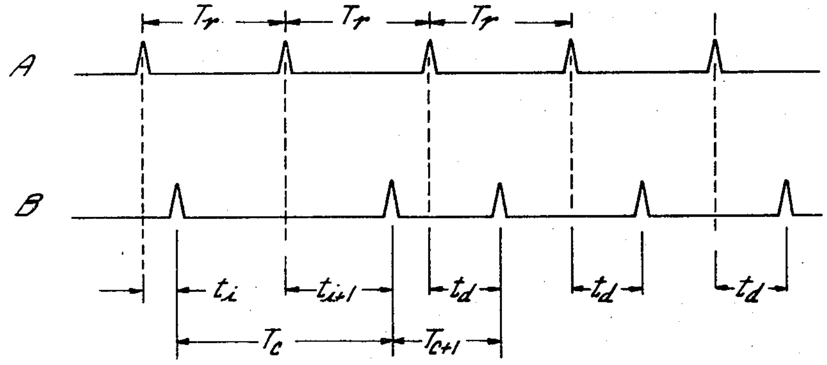

Equations (3) and (4) only express the correction $\Delta T_c$ if the pulses of waveform B lag behind the pulses of waveform A. As a result, if the pulses of waveform B were to drift slightly to the left, as viewed in FIG. 4, and a control signal according to equation (4) were employed, phase synchronization would be lost. In order to overcome this problem, the pulses of waveform B are synchronized to the pulses of waveform A with a constant offset, which is preferably one-half the period of waveform A. Waveforms A and B in FIG. 5 depict the establishment of phase synchronization after two cycles with a constant offset time delay designated $t_d$. The conditions represented by waveforms A and B in FIG. 5 are expressed by the following equations:

$$T_{c+1}=T_c+\Delta T_c \quad 5.$$

and $$\Delta T_c=t_i-2t_{i+1}+t_d \quad 6.$$

It will be noted that equations (3) and (5) are identical and that equation (6) is identical to equation (4) except for the addition of the term $t_d$.

Figure 2:
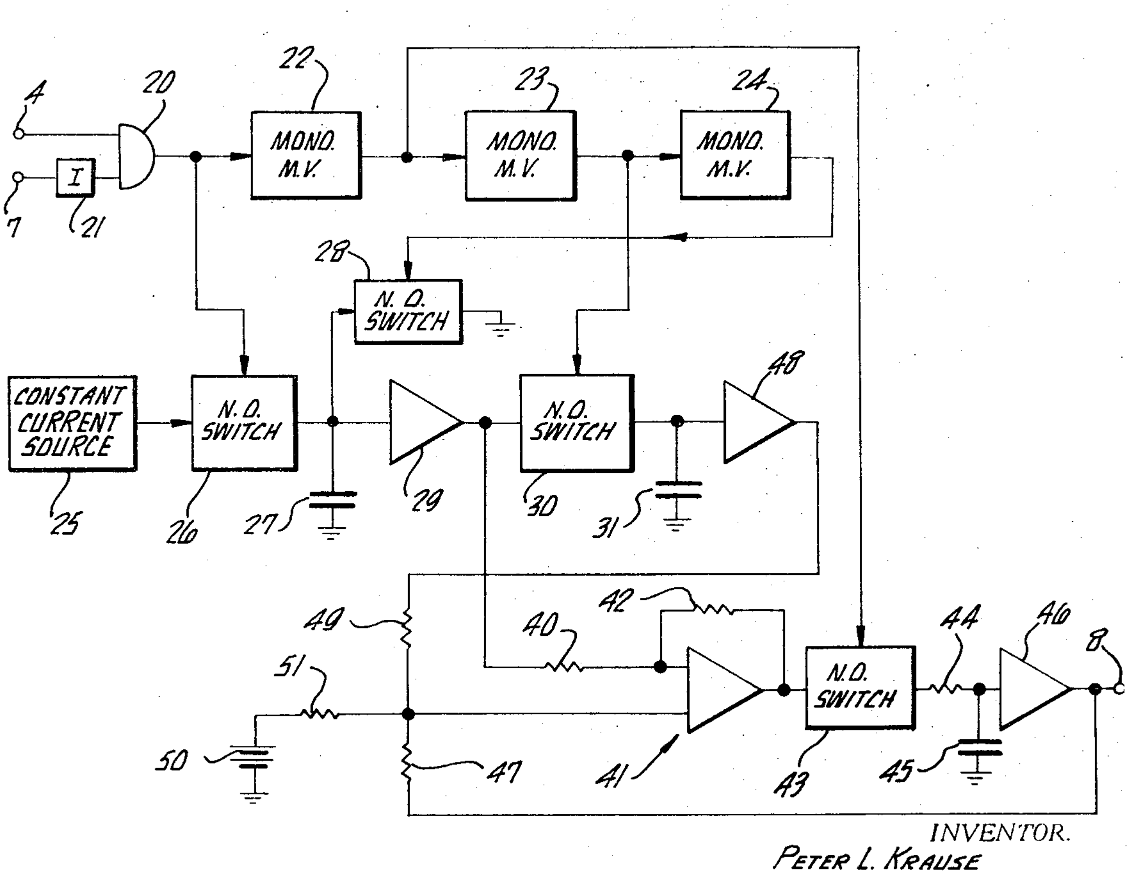
FIG. 2 is a schematic diagram partially in block form of the control signal generator of FIG. 1.

FIG. 2 discloses in detail the circuitry of generator 5. This circuitry produces at output terminal 8 a control signal representative of the term $\Delta T_c$ in equation (6). Briefly, a first characteristic signal is continuously produced that is proportional in amplitude to the time interval between given points of the reference signal applied to input terminal 4 and the controlled signal applied to input terminal 7 for each cycle in turn. Simultaneously, with the production of the first characteristic signal, a second characteristic signal is continuously produced that is proportional in amplitude to the time interval between given points of the reference signal applied to input terminal 4 and the controlled signal applied to input terminal 7 for each cycle in turn directly following the cycle represented by the first characteristic signal. The control signal is the difference between the first signal and twice the second signal plus a third signal having a constant amplitude that represents $t_d$.

Figure 6:
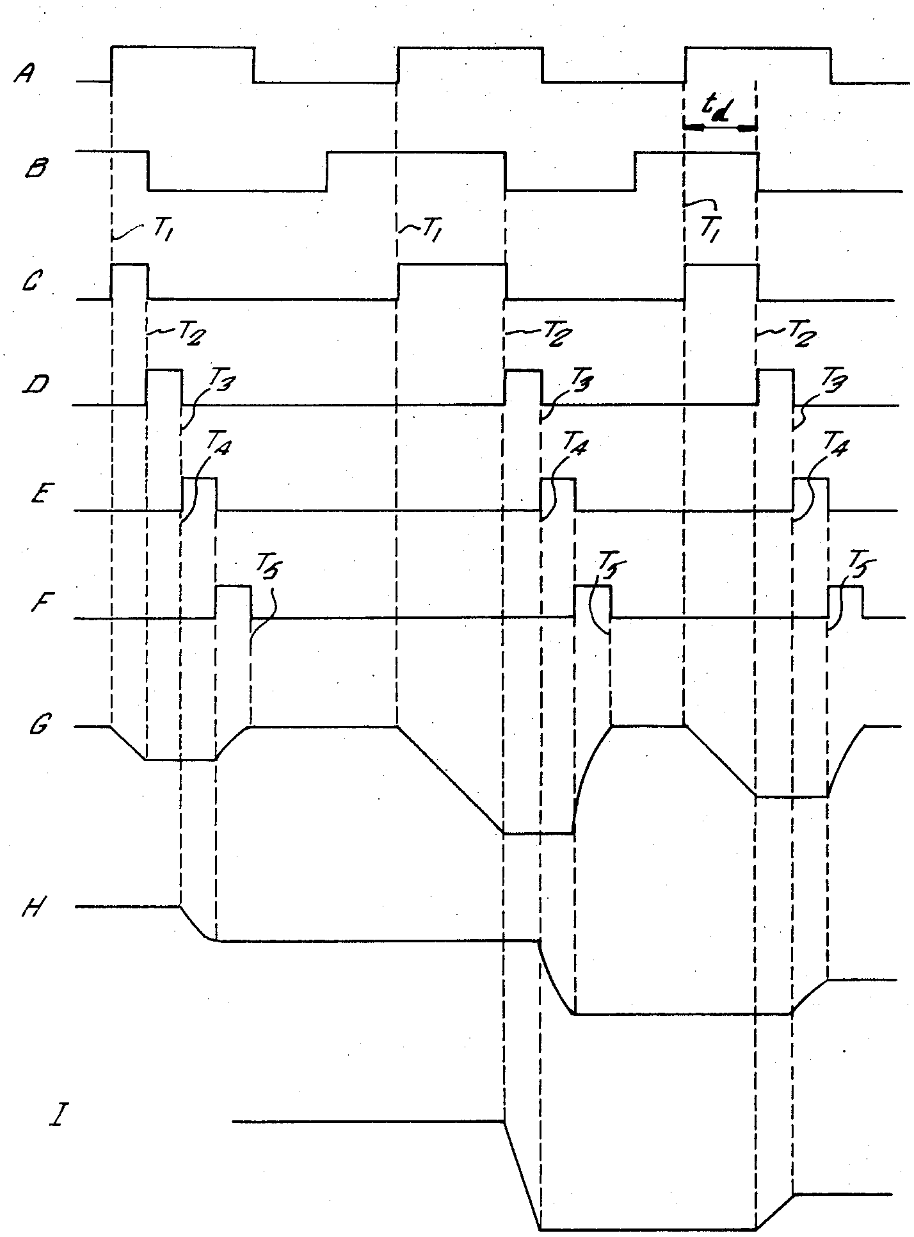

Input terminal 4 is directly connected to one input of an AND gate 20 and input terminal 7 is connected through an inverter 21 to the other input of AND gate 20. The signal from input terminal 4 applied to AND gate 20 is depicted in FIG. 6 by waveform A, and the signal from inverter 21 applied to AND gate 20 is depicted in FIG. 6 by waveform B. When the periodic signals supplied to input terminals 4 and 7 are completely synchronized in phase with one another without an offset, the inputs to AND gate 20 complement each other so the output of AND gate 20 does not become energized. Whenever the periodic signals supplied to input terminals 4 and 7 move out of phase with each other, the output of AND gate 20 becomes energized. The time duration in each cycle that the output of AND gate 20 is energized is directly proportional to the time interval between the given points of the periodic signals on input terminals 4 and 7. The output signal of AND gate 20 is depicted in FIG. 6 by waveform C. AND gate 20 and monostable multivibrators 22, 23, and 24 are connected in tandem. When the output of AND gate 20 changes from an energized state to an unenergized state, multivibrator 22 is triggered. Its output then remains energized for a fixed period of time, as represented by waveform D in FIG. 6. When the output of multivibrator 22 changes from an energized to a deenergized state, multivibrator 23 is triggered. Its output then remains energized for a fixed period of time, as represented by waveform E in FIG. 6. When the output of multivibrator 23 changes from an energized to a deenergized state, multivibrator 24 is triggered. Its output then remains energized for a fixed period of time, as represented by waveform F in FIG. 6.

A constant current source 25 is coupled through a normally open switch 26 to the ungrounded terminal of a capacitor 27. Constant current source 25 could be any type of device that supplies a constant charging current for capacitor 27 when switch 26 is closed so the voltage across capacitor 27 increases linearly. Normally open switch 26 closes while its control terminal, which is connected to the output of AND gate 20, is energized. Accordingly, the voltage across capacitor 27, which is depicted in FIG. 6 by waveform G, rises negatively during each cycle to an amplitude proportional to the time interval between given points of the reference signal and the controlled signal during the cycle in question. The ungrounded terminal of capacitor 27 is coupled through a normally open switch 28 to ground. Thus, when the control terminal of switch 28, which is connected to the output of multivibrator 24, is energized, capacitor 27 is discharged. The ungrounded terminal of capacitor 27 is also coupled through an isolating amplifier 29 having a gain of unity and a normally open switch 30 to the ungrounded terminal of a capacitor 31. When the control terminal of switch 30, which is connected to the output of multivibrator 23, is energized, the voltage appearing across capacitor 27 at that time is transferred to capacitor 31. The voltage across capacitor 31 is depicted by waveform H in FIG. 6. The output of amplifier 29 is coupled through a resistor 40 to one input of an operational amplifier 41. A feedback resistor 42 connects the output of operational amplifier 41 to this input. The output of operational amplifier 41 is also connected through a normally open switch 43 to an integrator comprising a resistor 44 and a capacitor 45. When the control terminal of switch 43, which is connected to the output of multivibrator 22, is energized, capacitor 45 begins to charge toward the voltage then appearing at the output of operational amplifier 41. The voltage across capacitor 45 is depicted by waveform I in FIG. 6. An isolating amplifier 46 having a gain of unity is connected between the junction of resistor 44 with capacitor 45 and output terminal 8. The output of amplifier 46 is fed back through a resistor 47 to the other input of operational amplifier 41. The ungrounded terminal of capacitor 31 is also coupled to the other input of operational amplifier 41 through an isolating amplifier 48 having a gain of unity and a resistor 49. A voltage source 50 with a constant amplitude, such as a battery, is also coupled through a resistor 51 to the other input of operational amplifier 41. Resistors 40 and 42 have the same resistance, resistors 49 and 51 have the same resistance, and resistor 47 has one-half the resistance of resistor 49.

During each cycle of the reference signal the circuitry of FIG. 2 operates as follows: At time $T_1$, the output of AND gate 20 becomes energized, as depicted in waveform C, and capacitor 27 begins to charge at a constant rate, as depicted in waveform G. At time $T_2$, AND gate 20 becomes deenergized, thereby triggering multivibrator 22, as depicted in waveform D, and stopping the charge of capacitor 27, as depicted in waveform G. While multivibrator 22 is energized, the output of operational amplifier 41 is being integrated by resistor 44 and capacitor 45. Immediately preceding the integrating operation, i.e., just before time $T_2$, the voltage applied to resistor 40 as one input to operational amplifier 41, hereafter designated $V_{i+1}$, is proportional to the time interval between given points of the reference signal and the controlled signal; the voltage applied to resistor 49 as the other input to operational amplifier 41, hereafter designated $V_i$, is proportional to the time interval between the given points of the reference signal and the control signal during the preceding cycle; and the constant voltage from source 50 applied to resistor 51, hereafter designated $V_d$, is proportional to the offset $t_d$ in the phase synchronization. Just prior to time $T_2$, the following equation is valid:

$$V_o - V_c = \tfrac{1}{2}(V_i - 2V_{i+1} + V_d) \qquad 7.$$

where $V_o$ is the voltage at the output of operational amplifier 41 and $V_c$ is the voltage across capacitor 45 just before time $T_2$. When switch 43 closes at time $T_2$ to begin integration, capacitor 45 starts to charge from the voltage $V_c$ toward the voltage $V_o$. Based on the assumption that the voltages $V_i$ and $V_{i+1}$ in equation (7) remain constant during the fixed period of integration between time $T_2$ and $T_3$, the voltage appearing across capacitor 45 at the end of this period, designated $V_{c+1}$, is expressed by the following equation:

$$V_{c+1} = V_c + \Delta V_c \qquad 8.$$

where $$\Delta V_c = K(V_i - 2V_{i+1} = V_d) \qquad 9.$$

and $K$ is a constant of proportionality. At time $T_3$ multivibrator 22 is deenergized, thereby triggering multivibrator 23, as depicted in waveform E, and opening switch 43 so the voltage that appears across capacitor 45 is held until the next cycle, as depicted in waveform I. It should be noted that, as switch 43 opens, no abrupt voltage changes occur at the output of operational amplifier 41 because of the permanent feedback path provided by resistor 42. Between times $T_3$ and $T_4$ multivibrator 23 is energized, as depicted in waveform E, and the voltage appearing across capacitor 27 is transferred through switch 30 to capacitor 31, as depicted in waveform H. At time $T_4$ multivibrator 23 is deenergized, thereby triggering multivibrator 24, as depicted in waveform F, and closing switch 28. Between times $T_4$ and $T_5$ capacitor 27 is discharged to ground potential through switch 28, as depicted by waveform G.

In summary, the circuitry of FIG. 2 performs the following operations during each cycle of the reference signal in the order recited: Measurement of the time interval between given points of the reference signal and the signal to be synchronized during the cycle in question across capacitor 27 responsive to AND gate 20; computation of the necessary change in the control signal responsive to multivibrator 22; transfer of the measured time interval to capacitor 31 responsive to multivibrator 23; and reset of capacitor 27 by grounding it responsive to multivibrator 24.

As illustrated by equations (7), (8), and (9), the control signal at output terminal 8 changes during each cycle of the reference signal by an amount proportional to the correction in the period of the periodic controlled signal required to establish phase synchronization with an offset time delay $t_d$. In other words, the voltages expressed in equations (8) and (9) are proportional in amplitude to the time intervals expressed in equations (5) and (6), respectively. When the circuitry of FIG. 2 is first brought into operation, it requires only two cycles of the reference signal to generate such a control signal at output terminal 8. In other words, as soon as $V_i$ and $V_{i+1}$ are both produced across capacitors 31 and 27, respectively, the circuitry of FIG. 2 is immediately able to compute the control signal. After synchronization is once established and any disturbances occur that tend to destroy synchronization, synchronization is reestablished with a time lag of only two cycles. The waveforms of FIG. 6, which depict three cycles of the reference signal, illustrate the establishment of phase synchronization of a controlled signal to the reference signal with an offset of $t_d$ after the third cycle. (It is to be remembered that waveform B in FIG. 6 is the complement of the controlled signal.)

Any direct current drift that may occur in the circuitry of FIG. 2 manifests itself as a change in the offset in phase synchronization, i.e., in the value of $t_d$. If the value of this offset is important, source 50 can be provided with an adjustment to vary the amplitude of its terminal voltage so as to cancel the effects of direct current drift.

Errors in the generation of the control signal effect only the synchronization rate and not the accuracy of the synchronization itself. These errors are exponentially reduced cycle by cycle during the operation of the circuitry of FIG. 2. For example, a 10 percent error in the correction provided by the circuitry of FIG. 2 would lead to a 10 percent phase error after the first correction of the controlled signal, a 1 percent error after the next correction, and a 0.1 percent error after the following correction, etc.

What is claimed is:

1. A synchronizing system comprising:
means for generating a periodic signal to serve as a reference;
means for generating a controllable periodic signal to be synchronized with the reference signal;
means generating a first signal proportional in amplitude to the time interval between given first points of the controlled and reference signals;
means generating a second signal proportional in amplitude to the time interval between given second points of the controlled and reference signals that occur earlier than the given first points;
means simultaneously responsive to the first and second signals for producing a control signal representative of the deviation of the controlled signal from synchronization with the reference signal; and
means responsive to the control signal for controlling the controllable signal generating means to establish synchronization between the controllable and reference signals.

2. The synchronizing system of claim 1, in which the first signal generating means comprises means responsive to the occurrence of each cycle in turn of one of the periodic signals for measuring the time interval between corresponding points of the periodic signals and the second signal generating means comprises means for delaying the second signal for a time interval of one cycle of the said one periodic signal.

3. The system of claim 1, in which the control signal generating means comprises means for combining the first and second signals to produce an error signal and means for integrating the error signal to form a control signal.

4. The synchronizing system of claim 1, in which the control means controls the period of the controllable signal in direct proportion to the control signal.

5. The synchronizing system of claim 1, in which the periodic signal generating means comprises a source of periodic signals at a frequency that is a multiple of the nominal frequency of the controllable signal and a counter that reduces the constant frequency by this multiple.

6. The synchronizing system of claim 1, in which the controllable signal generating means comprises a source of periodic signals at a nominal frequency that is a multiple of the frequency of the reference signal and a counter that reduces the nominal frequency by this multiple.

7. The synchronizing system of claim 1, in which the reference signal generating means comprises a source of reference signals at a constant frequency and a counter, and the controllable signal generating means comprises a source of signals at a nominal frequency and a second counter, the ratio of the constant frequency of the first source to the nominal frequency of the second source being $k_1$:$k_2$, the first counter reducing the constant frequency by a factor of $k_1$ and the second counter reducing the nominal frequency by a factor of $k_2$.

8. The synchronizing system of claim 1, in which the control signal represents the difference between the second signal and twice the first signal.

9. The synchronizing system of claim 8, in which the reference signal and controllable signal generating means produce pulses and the means for producing a first signal comprises a first capacitor, a constant current source, a first normally open switch connected between the current source and the capacitor, a second normally open switch connected between the capacitor and a reference potential, means for closing the first switch during each cycle for the interval between the given points of the signals from the reference signal and controllable signal generating means, and means for closing the second switch during each cycle for a first fixed time interval following the interval in which the first switch is closed.

10. The synchronizing system of claim 9, in which the means for producing a second signal comprises a second capacitor, a third switch connected between the first capacitor and the second capacitor, and means for closing the third switch during each cycle for a second fixed time interval between the first interval and the interval in which the first switch is closed.

11. The synchronizing system of claim 10, in which the control signal producing means comprises an operational amplifier having first and second inputs and an output, a resistive feedback connection between the first input and the output of the operational amplifier, a resistive connection between the first capacitor and the first input of the operational amplifier, a resistive connection between the second capacitor and the second input of the operational amplifier, a third capacitor, a fourth switch connecting the output of the operational amplifier to the third capacitor, a resistive feedback connection from the third capacitor to the second input of the operational amplifier, and means for closing the fourth switch during each cycle for a third fixed time interval between the second interval and the interval in which the first switch is closed.

12. The synchronizing system of claim 1, in which the control signal producing means comprises an operational amplifier having first and second inputs and an output, a resistive feedback connection between the first input and the output of the operational amplifier, a resistive connection between the means for producing a first signal and the first input of the operational amplifier, a resistive connection between the means for producing a second signal and the second input of the operational amplifier, a capacitor, a switch connecting the output of the operational amplifier to the capacitor, a resistive feedback connection from the capacitor to the second input of the operational amplifier, and means for closing the switch during each cycle for a fixed time interval after the first and second signals are produced.

13. The synchronizing system of claim 1, in which the control signal represents the difference between the second signal and twice the first signal plus a signal representative of a fixed time delay.

14. The synchronizing system of claim 13, in which the fixed time delay is one-half the period of the reference signal.

15. Apparatus for detecting the difference in phase between a periodic reference signal and a controllable periodic signal and for generating a control signal representative of such phase difference comprising:

means generating a first signal proportional in amplitude to the time interval between given first points of the controlled and reference signals;

means generating a second signal proportional in amplitude to the time interval between given second points of the controlled and reference signals; and means simultaneously responsive to the first and second signals for producing the control signal.

16. The synchronizing system of claim 15, wherein the given first points of the reference signal and the controlled signal are in a cycle different from the given second points of the reference signal and the controlled signal.

17. The synchronizing system of claim 16, wherein the given first points of the reference signal and the controlled signal are in the cycle preceding the cycle in which the given second points of the reference signal and the controlled signal are in.

* * * * *